(12) United States Patent
Newton et al.

(10) Patent No.: US 9,999,117 B2
(45) Date of Patent: Jun. 12, 2018

(54) METHODS AND APPARATUS FOR COMMISSIONING AND CONTROLLING TOUCH-CONTROLLED AND GESTURE-CONTROLLED LIGHTING UNITS AND LUMINAIRES

(71) Applicant: PHILIPS LIGHTING HOLDING B.V., Eindhoven (NL)

(72) Inventors: Philip Steven Newton, Waalre (NL); Tim Dekker, Eindhoven (NL); Ramon Antoine Wiro Clout, Eindhoven (NL); Dzmitry Viktorovich Aliakseyeu, Eindhoven (NL); Tatiana Aleksandrovna Lashina, Eindhoven (NL); Dirk Valentinus René Engelen, Heusden-Zolder (BE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/122,206

(22) PCT Filed: Feb. 12, 2015

(86) PCT No.: PCT/IB2015/051044
§ 371 (c)(1),
(2) Date: Aug. 29, 2016

(87) PCT Pub. No.: WO2015/128765
PCT Pub. Date: Sep. 3, 2015

(65) Prior Publication Data
US 2016/0374182 A1 Dec. 22, 2016

Related U.S. Application Data (60) Provisional application No. 61/946,205, filed on Feb. 28, 2014.

(51) Int. Cl.
*H05B 37/02* (2006.01)
*G06F 3/01* (2006.01)
(Continued)

(52) U.S. Cl.
CPC ......... *H05B 37/0272* (2013.01); *G06F 3/017* (2013.01); *G06F 3/04847* (2013.01); *G06F 3/04883* (2013.01); *Y02B 20/48* (2013.01)

(58) Field of Classification Search
CPC ................ H05B 37/02; H05B 37/0227; H05B 37/0272; H05B 33/08; H05B 33/0845;
(Continued)

(56) References Cited

U.S. PATENT DOCUMENTS

2013/0030589 A1 1/2013 Pessina et al.
2016/0037611 A1* 2/2016 Min .................... H05B 33/0842
315/152
(Continued)

FOREIGN PATENT DOCUMENTS

WO 2011161643 A1 12/2011
WO 2012032542 A1 3/2012
(Continued)

*Primary Examiner* — Jimmy Vu
(74) *Attorney, Agent, or Firm* — Meenakshy Chakravorty (57) ABSTRACT

Disclosed are methods and apparatus for lighting control. For example, a user may commission a touch-controlled luminaire (106) to emit light output having various lighting properties dependent on a manner in which the touch-controlled luminaire is touched subsequently. In particular, a user may use an electronic mobile device (102) such as a smart phone, tablet computer, or a wearable computing device (e.g., computing glasses, smart watches) to associate a touch event profile indicative of a manner in which a touch-controlled luminaire was touched (e.g., tapped, swiped, etc.) with a lighting control action. The user may then provide that association to the touch-controlled luminaire. When the touch-controlled luminaire is later touched in the same manner, it may adjust its light output in accordance with the lighting control action. Operation and commission of gesture-controlled luminaires (706) is also described herein.

20 Claims, 6 Drawing Sheets

(51) Int. Cl.
*G06F 3/0484* (2013.01)
*G06F 3/0488* (2013.01)

(58) Field of Classification Search
CPC ... H05B 33/0863; G06F 3/017; G06F 3/0847;
G06F 3/0883; Y02B 20/48
USPC .... 315/129–134, 185 R, 150–152, 291, 297,
315/307, 308, 312
See application file for complete search history.

(56) References Cited

U.S. PATENT DOCUMENTS

| | | |
|---|---|---|
| 2016/0073474 A1 | 3/2016 | Van De Sluis et al. |
| 2016/0242251 A1 | 8/2016 | Newton et al. |

FOREIGN PATENT DOCUMENTS

| | | |
|---|---|---|
| WO | 2013012547 A1 | 1/2013 |
| WO | 2013067569 A1 | 5/2013 |
| WO | 2013132416 A1 | 9/2013 |
| WO | 2014013377 | 1/2014 |

* cited by examiner

METHODS AND APPARATUS FOR COMMISSIONING AND CONTROLLING TOUCH-CONTROLLED AND GESTURE-CONTROLLED LIGHTING UNITS AND LUMINAIRES

CROSS-REFERENCE TO PRIOR APPLICATIONS

This application is the U.S. National Phase application under 35 U.S.C. § 371 of International Application No. PCT/IB2015/051044, filed on Feb. 12, 2015, which claims the benefit of U.S. Patent Application No. 61/946,205, filed on Feb. 28, 2014. These applications are hereby incorporated by reference herein.

TECHNICAL FIELD

The present invention is directed generally to lighting control. More particularly, various inventive methods and apparatus disclosed herein relate to commissioning and controlling touch-controlled and gesture-controlled luminaires and lighting units.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications.

Some lighting units and luminaires may be controlled using electronic mobile devices such as smart phones, tablet computers, laptop computers, and so forth. Some electronic mobile devices may communicate directly with lighting units or luminaires using communication technologies such as BlueTooth. Other electronic mobile devices may communicate with lighting units and/or luminaires indirectly using wireless network technology such as Wi-Fi. However, using an electronic mobile device to control a lighting unit or luminaire may be needlessly cumbersome if the lighting unit or luminaire is within the user's reach, or if the electronic mobile device is not easily located or lacks power. If the electronic mobile device is configured to control multiple lighting units or luminaires, then the user may be required to first select from the multiple lighting units, then select a lighting property to alter, and only then can the user actually adjust the light output of the lighting unit or luminaire she wishes to control. Thus, there is a need in the art for a simpler mechanism to control light output of lighting units and/or luminaires.

SUMMARY

The present disclosure is directed to inventive methods and apparatus for lighting control. For example, a user may commission a touch-controlled luminaire so that the user is subsequently able to use touch to control one or more selected properties of light output by the touch-controlled luminaire. In particular, a user may use an electronic mobile device such as a smart phone, tablet computer, or a wearable computing device (e.g., computing glasses, smart watches) to associate a touch event profile indicative of a manner in which a touch-controlled luminaire was touched (e.g., tapped, swiped, etc.) with a lighting control action. The user may then provide that association to the touch-controlled luminaire. When the touch-controlled luminaire is later touched in the same manner, it may adjust its light output in accordance with the lighting control action.

Generally, in one aspect, the invention relates to a method of configuring a touch-controlled luminaire using an electronic mobile device, which includes: wirelessly receiving, at the electronic mobile device from the touch-controlled luminaire, a touch event profile indicative of a manner in which a surface of the touch-controlled luminaire was touched; associating, at the electronic mobile device, a lighting control action with the touch event profile; and wirelessly transmitting, by the electronic mobile device to at least one lighting controller, an association between the lighting control action and the touch event profile.

In various embodiments, the method may further include transitioning the electronic mobile device into a commissioning mode for a predetermined time interval. During the predetermined time interval, the electronic mobile device may be configured to perform the following operations: rendering output to prompt a user to touch the surface of the touch-controlled luminaire; and awaiting wireless receipt of the touch event profile from the touch-controlled luminaire. In various versions at the end of the predetermined time interval, the electronic mobile device ceases awaiting wireless receipt of the touch event profile from the touch-controlled luminaire. In various versions of some of these embodiments, the method may further include rendering, by the electronic mobile device on a touch screen in response to receipt of the touch event profile, a user interface that is operable by a user to associate the lighting control action with the touch event profile. Also, rendering the user interface may include selectively rendering one or more user interface elements based on a capability of one or more light sources associated with the touch-controlled luminaire. The method may further include wirelessly receiving, at the electronic mobile device from the touch-controlled luminaire, information configured to facilitate determining the capability of the one or more light sources associated with the touch-controlled luminaire.

In various embodiments, wirelessly transmitting to at least one lighting controller includes wirelessly transmitting directly to a controller associated with the touch-controlled luminaire. In various embodiments, wirelessly transmitting to at least one lighting controller includes wirelessly transmitting to a lighting system bridge over a local area network.

In various embodiments, at least one of the wirelessly transmitting and wireless receiving is performed over a body area network between the electronic mobile device and the touch-controlled luminaire. In various versions, the method further includes detecting, by the electronic mobile device, a change in a capacitive path between the electronic mobile device and the touch-controlled luminaire; wirelessly transmitting, by the electronic mobile device to a remote computing device in response to the detected change in the capacitive path, an indication of a touch event; and wirelessly receiving, by the electronic mobile device from the remote computing device, an address associated with the lighting controller.

In various embodiments, the method may further include wirelessly transmitting, by the electronic mobile device to the lighting controller, a random number. In various embodiments, the method may further include broadcasting, by the electronic mobile device, a message to one or more lighting controllers associated with one or more touch-controlled luminaires, the message including an address of the electronic mobile device and an instruction configured to cause the one or more lighting controllers to transition into a commissioning mode in which they monitor for a touch by a user for a predetermined time interval.

In various embodiments, at least one of the wirelessly receiving and wireless transmitting is performed using near field communication, ZigBee or coded light.

In another aspect, at least one non-transitory computer-readable medium may include instructions that, in response to execution of the instructions by an electronic mobile device, cause the electronic mobile device to perform one or more of the methods described above.

In yet another aspect, the invention relates to a touch-controlled luminaire may include one or more surfaces, a wireless communication interface, one or more LEDs, and a controller operably coupled with the wireless communication interface and the one or more LEDs. The controller may be configured to: generate a touch event profile indicative of a manner in which the one or more surfaces were touched; receive, via the wireless communication interface from an electronic mobile device, an association between a lighting control action and the touch event profile; and selectively energize the one or more LEDs in accordance with the lighting control action in response to a subsequent touch by a user that corresponds to the touch event profile.

In various embodiments, the controller is further configured to transmit, to the electronic mobile device via the wireless communication interface, information configured to facilitate determining a capability of the one or more LEDs. In various versions, the information configured to facilitate determining the capability of the one or more LEDs comprises an identifier associated with a lighting unit with the one or more LEDs are integrated. In various versions, the information configured to facilitate determining the capability of the one or more LEDs comprises information about one or more properties of light that the one or more LEDs are capable of emitting.

In various embodiments, the wireless communication interface is configured to transmit or receive signals through a body area network between the touch-controlled luminaire and the electronic mobile device. In various embodiments, the controller is further configured to: detect a change in a strength of a wireless signal between the wireless communication interface and a remote computing device; and determine that the one or more surfaces have been touched based on a determination that the detected change satisfies a criterion.

In various embodiments, the controller is further configured to: receive, from the electronic mobile device, a broadcast message including an address of the electronic mobile device; transition the touch-controlled luminaire into a commissioning mode in which the controller monitors for a touch by a user for a predetermined time interval; and transmit, to the electronic mobile device, the touch event profile.

In various embodiments, the touch-controlled luminaire further includes an accelerometer operably coupled with the controller, wherein the controller is further configured to: receive, from the accelerometer, a signal representative of a measured mechanical force applied to the touch-controlled luminaire; determine, based on the signal from the accelerometer, that the measured mechanical force corresponds to one or more touch event profiles; and energize the one or more LEDs to emit light having one or more properties selected based on the determination.

In various embodiments, the controller is further configured to transmit, to a remote computing device associated with a wireless network, a random number. In various embodiments, the controller is further configured to: detect that the one or more surfaces has been touched; modulate a signal through a capacitive path between the electronic mobile device and the touch-controlled luminaire in response to the detection; and transmit, to a remote computing device in response to the detected touch change, an indication of a touch event.

In still another aspect, the invention relates to a gesture-controlled luminaire may include: a camera; a wireless communication interface; one or more LEDs; and a controller operably coupled with the camera, the wireless communication interface and the one or more LEDs. The controller may be configured to: generate a gesture event profile indicative of a gesture captured by the camera; receive, via the wireless communication interface from an electronic mobile device, an association between a lighting control action and the gesture event profile; and selectively energize the one or more LEDs in accordance with the lighting control action in response to a subsequent gesture by a user that corresponds to the gesture event profile.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable).

Also, an LED may be associated with a phosphor that is considered as an integral part of the LED (e.g., some types of white LEDs).

The term "light source" should be understood to refer to any one or more of a variety of radiation sources, including, but not limited to, LED-based sources (including one or more LEDs as defined above). A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The terms "lighting fixture" and "luminaire" are used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

A "lighting control action" may be an instruction or command to emit light having a particular lighting property. For example, a lighting control action may cause a lighting unit or luminaire in which a lighting unit is installed to alter a property of light it emits, such as hue, saturation, brightness, temperature, intensity, and so forth. A lighting control action may also cause a lighting unit or luminaire in which a lighting unit is installed to turn on or off, to begin/end a dynamic lighting sequence, to invoke a predetermined lighting scene (e.g., romantic, relaxing, naptime, etc.), and so forth.

A "touch-controlled" luminaire is a lighting fixture in which one or more lighting units may be installed, and which may be controlled by touching one or more of its otherwise non-operative surfaces. This is opposed to operating a tactile switch, pulling a string, pressing a button, or other more traditional mechanisms for operating a luminaire. That is not to say the touch-controlled luminaire cannot include tactile switches or other actuators as well; the touch-controlled luminaire may also be controlled by such traditional means. In some instances, a touch-controlled luminaire may be at least partially capacitive. A user's touch alters the capacitance in a manner detected by a lighting controller, which alters emitted light accordingly. A "gesture-controlled" luminaire is a lighting fixture that includes one or more optical sensors, such as a passive infrared sensors or a camera, that is configured to detect gestures made by a user (e.g., waving, pointing). A lighting controller may select one or more properties of light to emit (or to not emit) based on the detected gesture.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Some lighting units and luminaires may be controlled using electronic mobile devices such as smart phones, tablet computers, laptop computers, and so forth. However, using an electronic mobile device to control a lighting unit or luminaire may be needlessly cumbersome for a variety of reasons. Thus, there is a need in the art for a simpler mechanism to control light output of lighting units and/or luminaires. More generally, Applicants have recognized and appreciated that it would be beneficial to enable commissioning of a touch-controlled luminaire using an electronic mobile device, so that one or more properties of light emitted by the touch-controlled luminaire can subsequently be controlled by touch, rather than with the electronic mobile device. In view of the foregoing, various embodiments and implementations of the present invention are directed to commissioning a touch-controlled luminaire with an electronic mobile device to associate one or more touch event profiles representative of one or more detected touch events with one or more lighting control actions.

Figure 1:
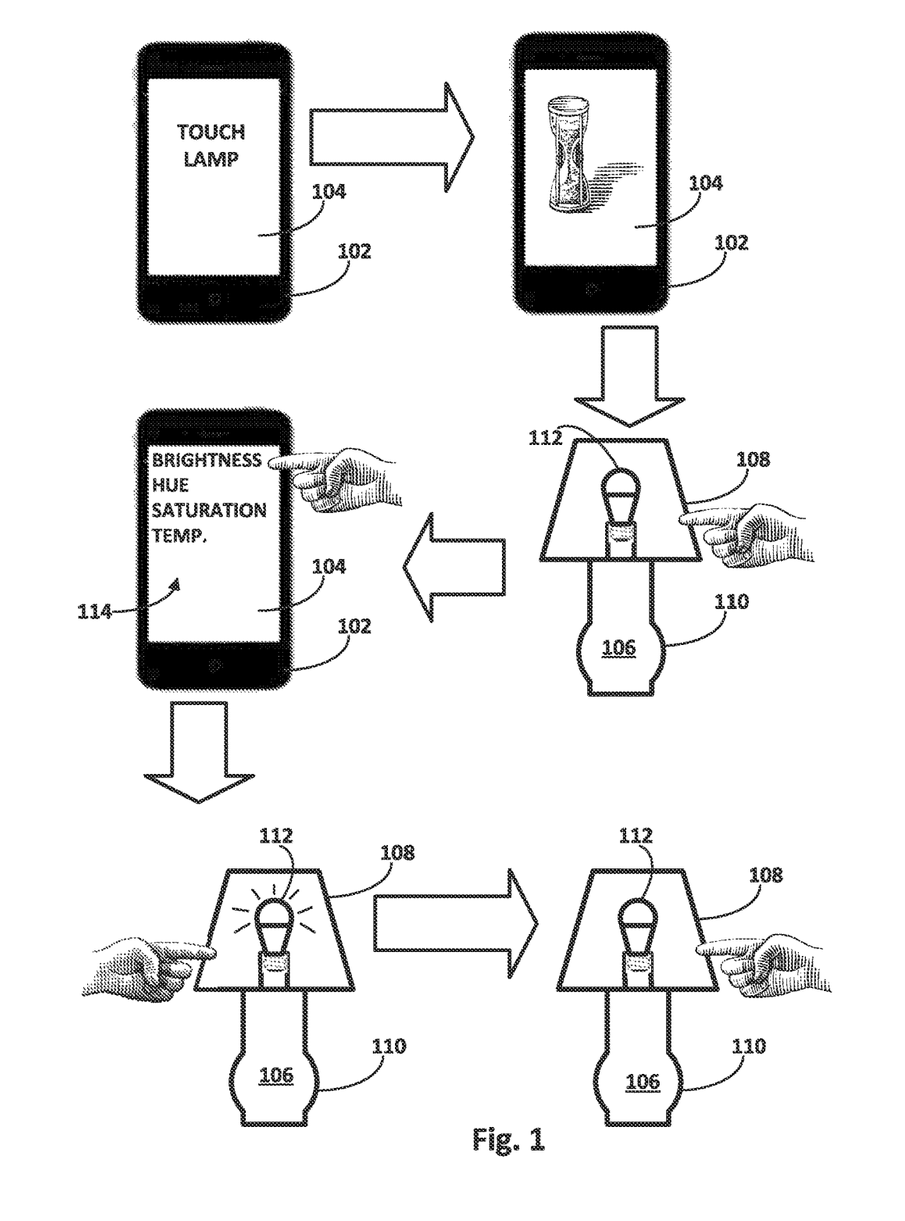
FIG. 1 illustrates an example process by which a touch-controlled luminaire may be commissioned and controlled, in accordance with various embodiments.

Referring to FIG. 1, in one embodiment, an electronic mobile device 102 may be operated by a user (not shown) to initiate a light commissioning and control application. In some embodiments, the light commissioning and control application may be software stored in memory (not depicted) of electronic mobile device 102 and executed by one or more processors (also not depicted) of electronic mobile device, although this is not required.

Once initiated, the light commissioning and control application may prompt the user to touch a touch-controlled luminaire. For instance, in FIG. 1 at top left, electronic mobile device 102 has rendered, on a touch screen 104, an instruction to "TOUCH LAMP." In some embodiments, and as shown at top right, the light commissioning and control application may give the user a predetermined amount of time (e.g., thirty seconds, one minute, etc.) to touch a lamp, and may display an indicator of a countdown (e.g., an hour glass, or a numeric countdown).

During this predetermined time interval, the user may touch a luminaire 106. In the example of FIG. 1, luminaire 106 is a standing lamp with a lamp shade 108. However, this is not meant to be limiting, and touch-controlled luminaires as described herein may come in various other forms, such as hanging luminaires, tall standing luminaires (e.g., which may be set on the floor), ornamental luminaries (e.g., toys, signs, etc.), and so forth.

A user's touch may be detected by luminaire 106 in various ways. In the example of FIG. 1, a user has touched luminaire 106 at lampshade 108. This applied force may be detected by an apparatus such as an accelerometer or gyroscope (not depicted) contained in luminaire 106, or in a lighting unit 112 installed in luminaire. A lighting controller associated with luminaire 106 or with a lighting system of which luminaire 106 is part may determine that this measured force corresponds to a predetermined touch profile (e.g., measured impulse response most closely associated with a tap). As will be described below, the action taken in response to the detected touch may be selected by a user during a commissioning process.

Luminaire 106 may detect touch in other manners as well. In some embodiments, luminaire 106 may be at least partially capacitive, such that a user touching it will cause that capacitance to change in a manner that may be detected and acted on. For instance, a strip of capacitive material (not depicted) may be placed somewhere in luminaire 106, e.g., behind an encasing at a base of luminaire 106. Touching the base will cause an increase in capacitance above a threshold which may trigger luminaire 106 to determine that its surface 110 has been touched.

In some embodiments, luminaire 106 may be in radio communication with a remote computing device, such as a lighting controller (e.g., a bridge) associated with a lighting system of which luminaire 106 (or lighting unit 112) is a member, and/or electronic mobile device 102. This radio communication may be implemented using various technologies, including but not limited to ZigBee, Wi-Fi, near field communication ("NFC"), BlueTooth, etc. The human body is not a good conductor of high frequency radio signals. Accordingly, touching, or even being too close to luminaire 106, may cause a severe attenuation in the radio signal, which luminaire 106 may interpret as a touch. In some embodiments, this change may be detected in a Received Signal Strength Indicator, or RSSI, alone or in combination with a link quality indicator. In some instances, the resulting change in signal strength will be as large as eighty db, e.g., for 2.4 GHz radio transmissions. In addition to the magnitude of the change in signal strength, in some embodiments, a speed at which the signal strength changed may also be considered in determining whether a touch event has occurred. A sudden change may indicate a deliberate user touch, whereas a gradual change may indicate incidental physical contact that may be caused, for instance, by a pet brushing against luminaire 106.

Regardless of how luminaire 106 detects it has been touched, in various embodiments, luminaire 106 may generate a touch event profile indicative of a manner in which its surface 110 or lampshade 108 was touched. In some embodiments, a touch event profile may include a recordation of an impulse response detected by an accelerometer. In some embodiments, a touch event profile may include data indicative of an alteration in capacitance. In some embodiments, a touch event profile may include data indicative of an attenuation in a radio signal between wireless communication interface 224 (see FIG. 2) and a remote computing device, such as bridge 232. In some embodiments, luminaire 106 may then transmit the touch event profile to electronic mobile device 102.

In some embodiments, luminaire 106 may also transmit, to electronic mobile device 102, information configured to facilitate a determination by electronic mobile device 102 of one or more light output capabilities of luminaire 106. In some embodiments, the information may include an identifier associated with luminaire 106 and/or its installed lighting unit 112. This may enable electronic mobile device 102 to retrieve, e.g., over the Internet, information about light output capabilities of luminaire. In other embodiments, the information may more directly include information about one or more properties of light that luminaire 106 is capable of emitting.

Having received the touch event profile, and in some instances the information to facilitate determining light output capabilities of luminaire 106, electronic mobile device 102 may render a user interface 114 that is operable by a user to associate a lighting control action with the touch event profile. For instance, in the middle left of FIG. 1, electronic mobile device 102 has rendered on touch screen 104 a menu of lighting control actions (brightness, hue, saturation, temperature) that may be associated with the touch event profile. In some embodiments, electronic mobile device 102 may selectively render one or more user interface elements based on light output capability of luminaire 106. If luminaire is incapable of emitted more than one hue, then the "hue" option may not be presented.

A user may select one or more of these lighting control actions to associate the received touch event profile with the selected lighting control action. Electronic mobile device 102 may then transmit the association back to luminaire 106 or to a lighting controller that controls lighting output of luminaire 106. In FIG. 1, for instance, assume the user selects brightness. As shown at bottom left, touching luminaire 106 at lampshade 108 in the future may cause luminaire to alter the brightness of light it emits. As shown at bottom right, the user may touch lampshade 108 in a similar manner to alter brightness again, in this instance turning brightness all the way down so that luminaire 106 is off.

Figure 2:
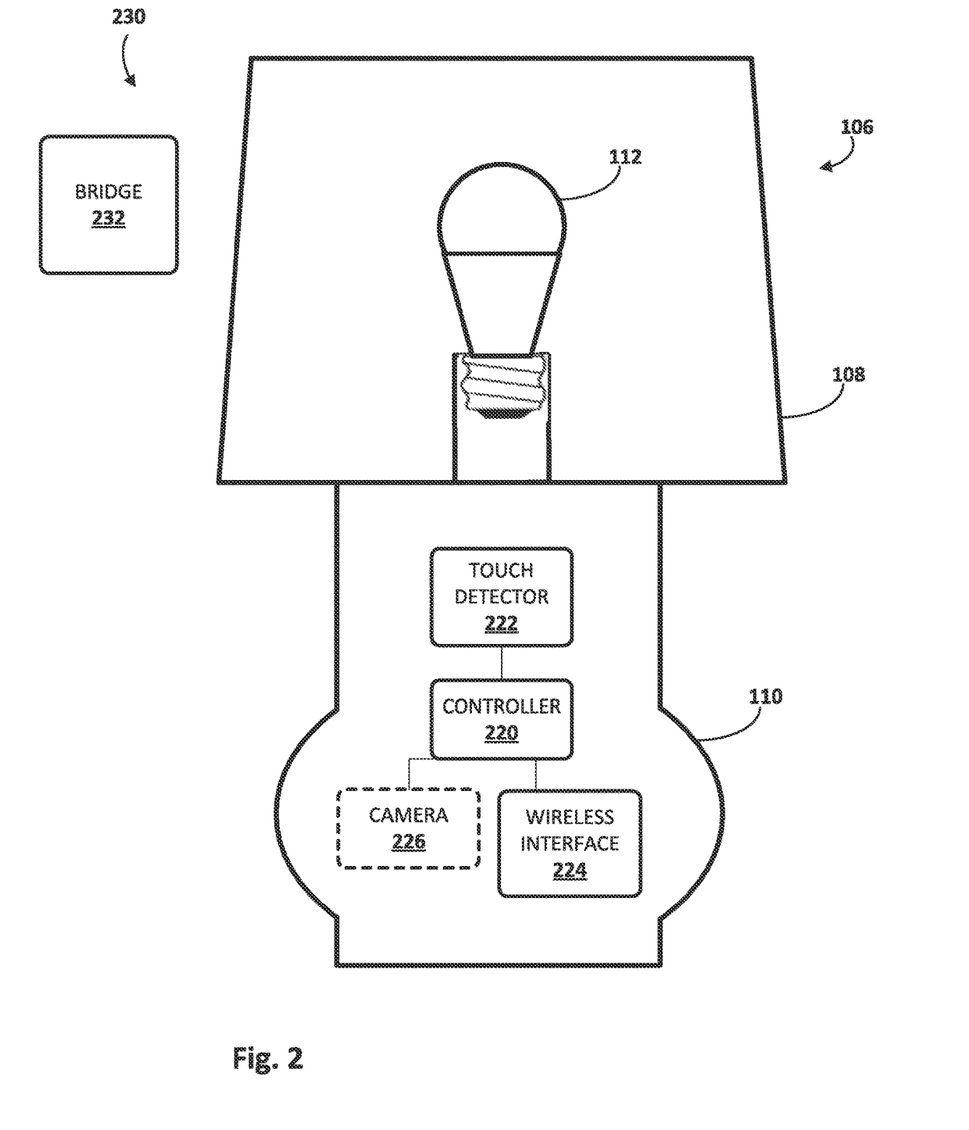
FIG. 2 depicts example components of a touch-controlled luminaire, in accordance with various embodiments.

FIG. 2 depicts example components of luminaire 106, in accordance with various embodiments. A controller 220 may be operably coupled with a touch detector 222 and a wireless communication interface 224. Touch detector 222 may provide one or more signals indicative of touches to surface 110 to controller 220. Wireless interface 224 may allow controller 220 to exchange data through various wireless mediums with remote computing devices, such as electronic mobile device 102 of FIG. 1. An optional camera 226 is depicted in dashed lines. In some embodiments, camera 226 may be provided in addition to or instead of touch detector 222 to cause touch-controlled luminaire 106 to be a gesture-controlled luminaire 706 (see FIG. 7).

Touch detector 222 may come in various forms, some of which were described above. For instance, touch detector 222 may be an accelerometer that is configured to sense forces or movements of luminaire 106, e.g., that might be caused by a user's touch. In various embodiments, such a touch detector may be installed in luminaire 106 or in lighting unit 112. Additionally or alternatively, touch detector 222 may be a component configured to monitor capacitance of all or selected portions of luminaire 106. Controller 220 may determine whether changes in capacitance measured by touch detector 222 satisfy a threshold, and may act accordingly. Additionally or alternatively, touch detector 222 may monitor strength of a wireless signal between wireless communication interface 224 and a remote computing device, such as a lighting system bridge 232. As described above, any attenuation in that signal that satisfies a threshold may cause controller 220 to detect a touch event.

Wireless communication interface 224 may come in various forms as well. In some embodiments, wireless communication interface 224 may communicate with remote computing devices directly or indirectly (e.g., through a local wireless network) using technologies such as BlueTooth, ZigBee, coded light, Wi-Fi, RFID, NFC, and so forth. In some embodiments, wireless communication interface 224 may be configured to communicate with a remote computing device using technology described in the IEEE 802.15 standards (Wireless Personal Area Networks, or "WPAN"), including but not limited to visible light communication (802.15.7) and/or body area networks (802.15.6). Although only a single wireless communication interface 224 is depicted in FIG. 2, this is not meant to be limiting. In various embodiments, luminaire 106 (or in some cases, installed lighting unit 112) may include more than one wireless communication, and additionally may include one or more wired communication interfaces (not depicted in FIG. 2). For example, a single luminaire 106 may include a ZigBee interface, an NFC interface and/or a coded light interface.

In various embodiments, controller 220 itself may selectively energize lighting unit 112 based on various events and/or inputs (e.g., touches, taps, etc.), without any intervening intelligence. In some embodiments, lighting unit 112 may be part of a lighting system 230 that includes a remote lighting controller in the form of a bridge 232. Bridge 232 may be in communication with luminaire 106/lighting unit 112 and/or other luminaires/lighting units over one or more wireless networks. In some such embodiments, bridge 232 may perform selected operations described herein as being controlled by a lighting controller. For example, bridge 232 may transmit commands containing lighting control actions to wireless communication interface 224. Controller 220 may energize lighting unit 112 to emit light in accordance with the lighting control actions. Thus, when operations are described herein as being performed by a "lighting controller," it should be understood that these operations may be performed by a lighting controller such as controller 220 that is integral with luminaire 106 (or lighting unit 112), or by a lighting controller in the form of a lighting system bridge 232.

Figure 3:
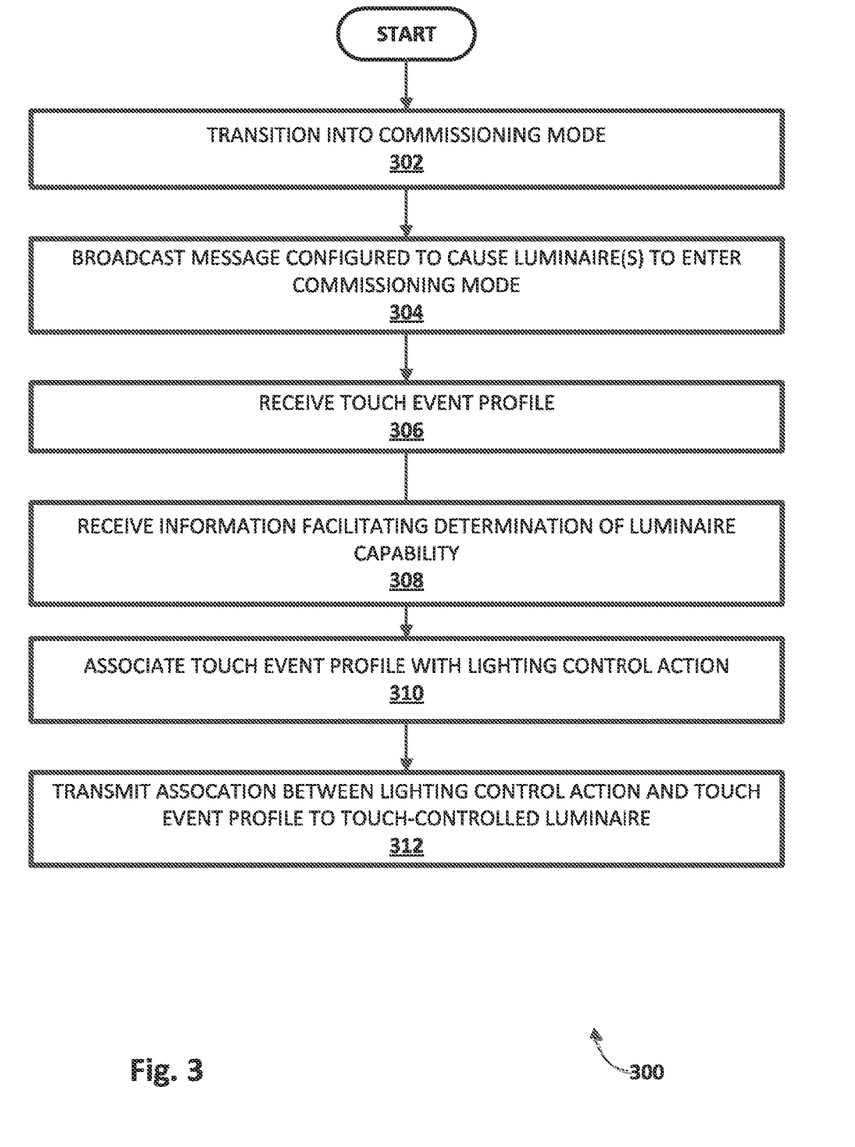
FIG. 3 depicts an example method of commissioning and controlling a touch-controlled luminaire from the perspective of an electronic mobile device, in accordance with various embodiments.

FIG. 3 depicts an example method 300 that may be performed with an electronic mobile device, such as electronic mobile device 102 in FIG. 1, to commission touch-controlled luminaire 106 to perform various lighting control operations in response to various types of touch. At block 302, electronic mobile device 102 may transition into a commissioning mode for a predetermined time interval. During the predetermined time interval, electronic mobile device 102 may be configured to render, e.g., on touchscreen 104, output that prompts a user to touch the surface of touch-controlled luminaire 106. During the predetermined time interval, electronic mobile device 102 may be further configured to awaiting wireless receipt of a touch event profile from touch-controlled luminaire 106. In some embodiments, at the end of the predetermined time interval, electronic mobile device 102 may cease awaiting wireless receipt of the touch event profile from touch-controlled luminaire 106.

At block 304, electronic mobile device 102 may broadcast a message to one or more lighting controllers associated with one or more touch-controlled luminaires 106. The message may include an address (e.g., Internet Protocol, or "IP," address) of electronic mobile device 102 and an instruction configured to cause the one or more lighting controllers to transition one or more touch-controlled luminaires (e.g., 106) into a commissioning mode in which they monitor for a touch by a user for a predetermined time interval.

At block 306, a touch event profile may be wirelessly received from touch-controlled luminaire 106. A user may desire to operate luminaire in the future to emit light having one or more selected properties by touching it again in this manner. At block 308, electronic mobile device 102 may receive, from touch-controlled luminaire 106, information configured to facilitate determining the capability of the one or more light sources associated with touch-controlled luminaire 106. In some embodiments, this information may include an identifier of touch-controlled luminaire 106 (or installed lighting unit 112). Electronic mobile device 102 may use this information to gather other information (e.g., over the Internet) about capabilities of luminaire 106 (or lighting unit 112). In other embodiments, this information may more directly include information about light output capabilities of luminaire 106 and/or lighting unit 112.

At block 310, a lighting control action may be associated with the received touch event profile. For instance, electronic mobile device 102 may render on touch screen 104 a user interface that is operable by a user to associate one or more lighting control actions with the received touch event profile, as shown on the middle left in FIG. 1. In some embodiments, electronic mobile device 102 may selectively render one or more user interface elements (e.g., menu items) based on a capability of one or more light sources associated with touch-controlled luminaire 106. A user may configure one or more lighting control actions, such as turning the light on or off, or adjusting a particular property of emitted light (e.g., hue, saturation, temperature, flashing sequence, coded light output, etc.), in various ways, e.g., to toggle through a range of values.

At block 312, electronic mobile device 102 may wirelessly transmit, to at least one lighting controller, the selected association between the lighting control action and the touch event profile. Assume a user selects "brightness" as the lighting control action to be associated with the received touch event profile. Electronic mobile device 102 may transmit a message such as "tap:brightness," which may inform the lighting controller that to interpret future taps that are similar to the recorded tap as instructions to alter brightness of light output by luminaire 106. In some embodiments, the user may be able to specify a range of selected values, e.g., that may be toggled through by repeated taps. For instance, the user could cause the message sent from electronic mobile device 102 to luminaire 106 to read, "brightness:range:0-50," to indicate that there should be fifty potential levels of brightness that are achievable. As another example, the message could read, "brightness:discrete:0:50:100:150" to indicate that the user wishes to be able to toggle through four discrete levels of brightness. In some embodiments, the association between the lighting control action and the touch event profile may be wirelessly transmitted directly to a controller associated with touch-controlled luminaire 106, e.g., using NFC or a body area network between electronic mobile device 102 and touch-controlled luminaire 106. In some embodiments, the association between the lighting control action and the touch event profile may be transmitted to lighting system bridge 232, e.g., over a local area network.

Electronic mobile device 102 may learn an address of a lighting controller that is in charge of light emitted by touch-controlled luminaire 106 (e.g., so that it knows where to transmit the association) in various ways. In some embodiments, luminaire 106 may simply transmit its own address to electronic mobile device 102 at the address electronic mobile device 102 broadcasted at block 302. In some embodiments, e.g., where block 302 is omitted, touch-controlled luminaire 106 may modulate a periodic signal through a capacitive path that is formed between electronic mobile device 102 and touch-controlled luminaire 106 when the user touches luminaire 106 (e.g., a body area network). Electronic mobile device 102 may detect this periodic signal and may, in response, transmit, to a remote computing device such as lighting system bridge 232 or luminaire 106, an indication of a touch event. Electronic mobile device 102 may then receive, from the remote computing device, an address associated with a lighting controller in charge of light emitted by touch-controlled luminaire 106, which as noted above may be integral with luminaire 106, lighting unit 112, or may be part of lighting system bridge 232.

In some embodiments, transmission quality on a body area network may be low. In such case, data transmitted between electronic mobile device 102 and remote devices (e.g., touch-controlled luminaire 106, lighting system bridge 232) may include a random number, which may be extended with various error correction methods. This random number may be transmitted by both luminaire 106 and electronic mobile device 102 to a lighting controller (e.g., lighting system bridge 232). The lighting controller may create an association between touch-controlled luminaire 106 and electronic mobile device 102. Electronic mobile device 102 may then know how to address touch-controlled luminaire 106, and vice versa.

Figure 4:
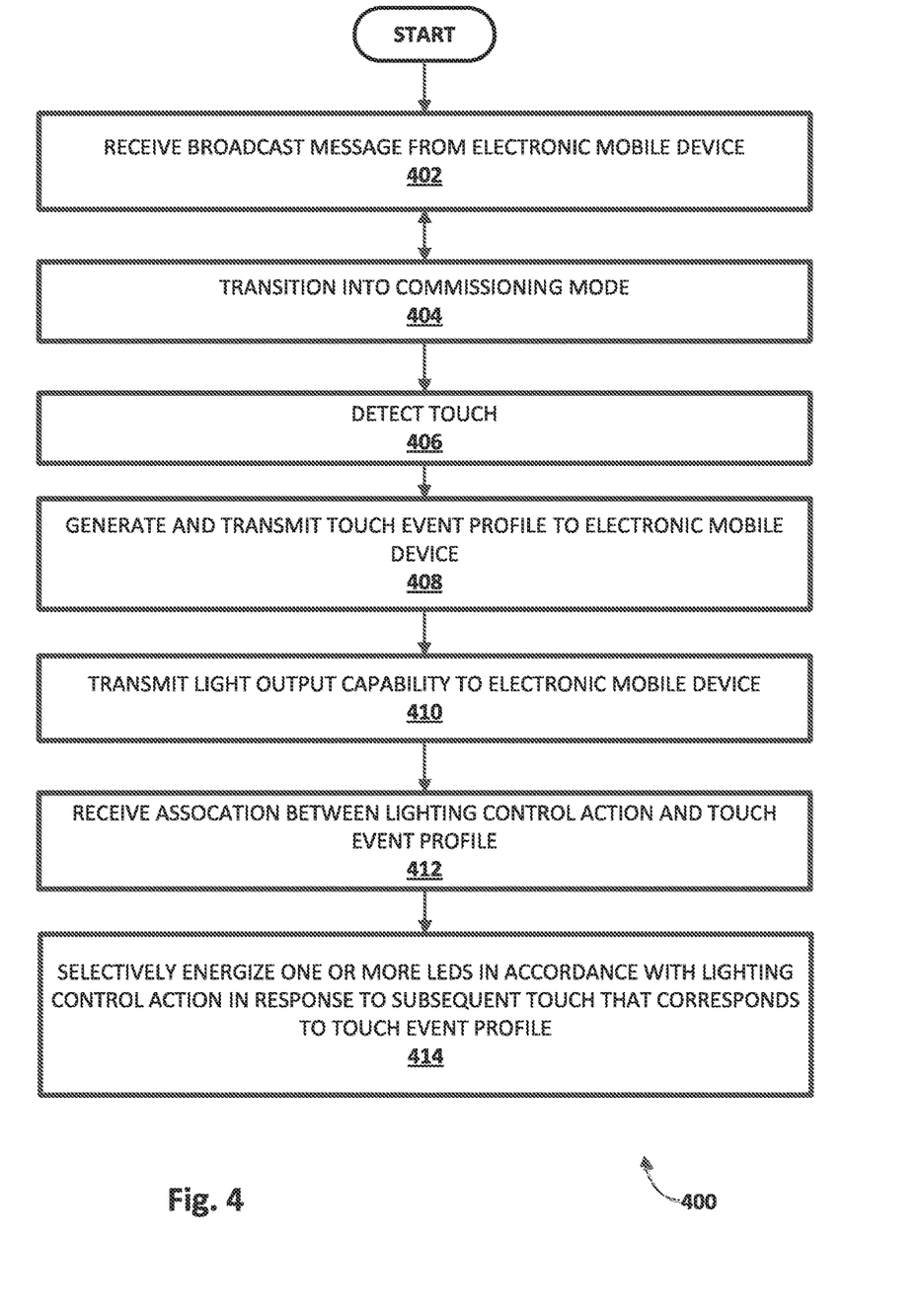
FIG. 4 depicts an example method of commissioning and controlling a touch-controlled luminaire from the perspective of a touch-controlled luminaire, in accordance with various embodiments.

FIG. 4 depicts a method 400 that may be performed by touch-controlled luminaire 106, in accordance with various embodiments. At block 402, touch-controlled luminaire 106 may receive, e.g., from electronic mobile device 102, a broadcast message. As noted above, in various embodiments, this broadcast message may include an address of electronic mobile device 102 and/or an instruction configured to cause luminaire 106 to transition into a commissioning mode in which it monitors for a touch by a user for a predetermined time interval. At block 404, touch-controlled luminaire 106 may transition into the commissioning mode for the predetermined time interval.

At block 406, while in the commissioning mode, touch-controlled luminaire 106 may detect that a user has touched its surface 110 in one of the manners described above (e.g., by detecting applied force with an accelerometer, a change in capacitance, or an attenuation in a signal strength). Various types of touches may be detected, including but not limited to taps, swipes, caresses, rubs, double taps (e.g., two or more taps in quick succession), simultaneous contact at multiple locations, and so forth.

At block 408, touch-controlled luminaire 106 may generate and transmit, to electronic mobile device 102, a touch event profile representing the touch detected at block 406. At block 410, which may occur before, after or concurrently with block 408, touch-controlled luminaire 106 may transmit, e.g., to electronic mobile device 102, light output capabilities of luminaire 106.

At block 412, touch-controlled luminaire 106 may receive, e.g., from electronic mobile device 102, an association between one or more lighting control actions and one or more touch event profiles. At block 414, touch-controlled luminaire 106 may selectively energize lighting unit 112 in accordance with a selected lighting control action in response to a subsequent detected touch that corresponds to a touch event profile, e.g., generated at block 408.

Figure 5:
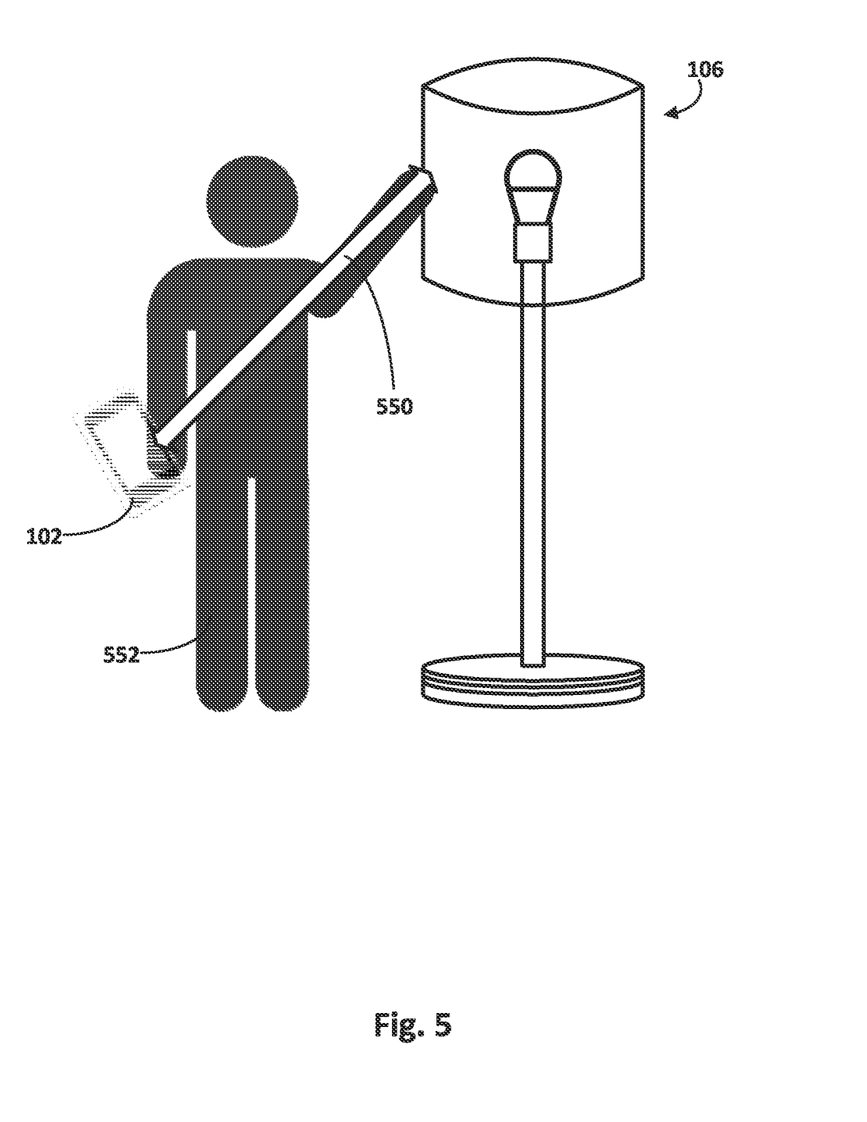
FIG. 5 depicts an example of how a body area network may be used to exchange data between a touch-controlled luminaire and an electronic mobile device, in accordance with various embodiments.

FIG. 5 depicts one example of how a body area network may be used to exchange data between electronic mobile device 102 and touch-controlled luminaire 106. In some embodiments, when user 552 interacts with electronic mobile device 102 to commission a touch-controlled luminaire 106, a radio signal 550 may be sent to touch-controlled luminaire 106 using the user's body as transmitting media. Touch-controlled luminaire 106 may include a module (not depicted) to decode the radio signal and adjust one or more properties of light output accordingly. In some embodiments, interaction between user 552 and luminaire 106 may be simplified such that in a first step the user operates electronic mobile device 102 to select a desired lighting control action, and in a second step transfers this lighting control action to luminaire 106 by touching luminaire 106 while still holding electronic mobile device 102. The same approach may be used for secure transfer of keys or identifiers.

Figure 6:
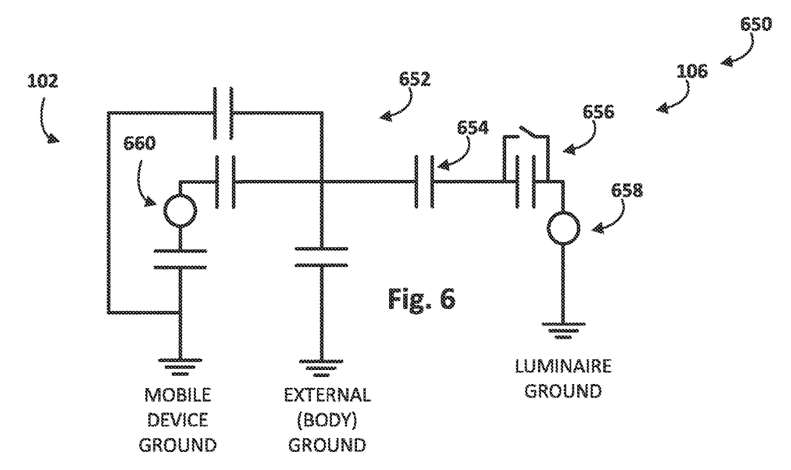
FIG. 6 schematically depicts an example body area network circuit that may be formed in a human body between an electronic mobile device and a touch-controlled luminaire, in accordance with various embodiments.

FIG. 6 schematically depicts an example circuit 650 that may be formed when a body area network is implemented through a body node 652 between electronic mobile device 102 and touch-controlled luminaire 106, in accordance with various embodiments. A touch point 654 may a point where a user touches touch-controlled luminaire 106. A capacitive path modifier 656 may be configured to modulate the periodic signal referred to previously in response to detection, e.g., by a sensor 658 near touch point 654, of a user's touch on surface 110 of luminaire 106. This periodic signal may be sensed by another sensor 660 at electronic mobile device 102.

In addition or instead of generating an association between a lighting control action and a particular type of touch, in some embodiments, a desired lighting setting may simply be "pasted," e.g., with electronic mobile device 102, to each touch-controlled luminaire 106 that is touched after the light control action is selected. If a particular touch-controlled luminaire 106 is not capable of accepting the lighting settings (e.g., it is incapable of implementing them), a translation may be made to the best approximation, or a warning signal may be generated on electronic mobile device 102 and/or touch-controlled luminaire 106. For example, if green 50% brightness is selected on electronic mobile device 102, then all touch-controlled luminaires 106 that are touched within a predetermined time interval may transition to emitting green light at 50%. Touch controlled-luminaires that are not capable of producing green may instead emit light with at least a 50% brightness level, or may generate a warning signal.

In situations where multiple touch-controlled luminaires may be controlled by multiple users, the touch-controlled luminaires may be configured to distinguish between users based on the users' electronic mobile devices. For instance, in various embodiments, the touch-controlled luminaires may be configured to be commission and controlled exclusively using body area networks. That way, a local area network (e.g., a Wi-Fi network) may not be necessary. A user carrying an electronic mobile device may be able to commission the touch-controlled luminaire by way of a body area network from that user's electronic mobile device to the touch-controlled luminaire. A user not carrying an electronic mobile device (or at least one that does not have a luminaire commissioning application installed) may not be able to commission and/or operate the touch-controlled luminaire. Similarly, if a user later touches a touch-controlled luminaire, and the touch-controlled luminaire is unable to communicate with an electronic mobile device on the user's person through a body area network, the touch-controlled luminaire may ignore the user's touch.

As another example, a first user may wish to control brightness of a touch-controlled luminaire, and a second user may wish to control hue output of the touch-controlled luminaire. Assume both users have previously commissioned the touch-controlled luminaire to operate in accordance with their respective preferences. When the first user touches the touch-controlled luminaire, the touch-controlled luminaire may determine it's the first user by identifying the first user's electronic mobile device through a body area network through the first user, and may accordingly adjust the brightness. Likewise, when the second user touches the touch-controlled luminaire, the touch-controlled luminaire may determine it's the second user by identifying the second user's electronic mobile device through a body area network through the second user, and may accordingly adjust the hue output.

If few users who might control a touch-controlled luminaire are present, then a simplified embodiment may be employed. An association between electronic mobile device 102 and touch-controlled luminaire 106 may be made during a limited time interval after a user initiates a light commissioning application on electronic mobile device 102 and is prompted to touch a touch-controlled luminaire. Electronic mobile device 102 may broadcast a message to nearby luminaires to wait for a touch. The broadcast may include an address associated with electronic mobile device 102, such as an IP address. When a touch is detected by a touch-controlled luminaire during the time period, this event may be forwarded to electronic mobile device 102. Electronic mobile device 102 may then make the association between touch-controlled luminaire 106 and electronic mobile device 102. This method may work in cases where there is no conductive path between touch-controlled luminaire 106 and electronic mobile device 102.

Figure 7:
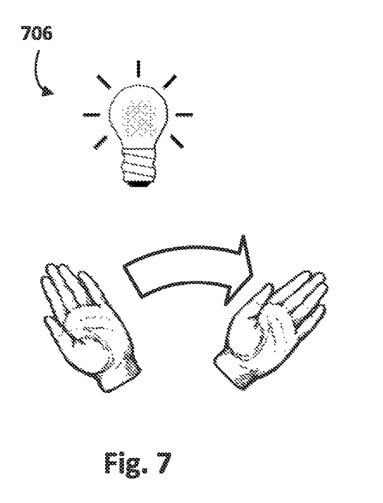
FIGS. 7-8 depict examples of controlling a gesture-controlled luminaire with one or more gestures, in accordance with various embodiments.

When a luminaire is out-of-reach of a user, operating that luminaire with touch may not be practicable. For instance, users typically cannot reach luminaires installed in ceilings without undue effort. Accordingly, in another aspect, a "touchless" solution may be provided. In various embodiments, a vision sensor such as a light sensor (e.g., camera 226 in FIG. 2), an ultrasound distance sensor, or a passive infrared sensor may be employed in a hard-to-reach luminaire to detect one or more hand gestures made towards the luminaire. In FIG. 7, for example, a user may wave at a gesture-controlled luminaire 706 (depicted schematically as a light bulb in FIG. 7). Gesture-controlled luminaire 706 may determine whether the observed gesture corresponds to one or more predetermined gesture event profiles that are associated with particular lighting control actions. In various embodiments, associations between lighting control actions and gesture event profiles may be created using methods similar to those described above that are used to create associations between lighting control actions and touch event profiles. In various embodiments, gesture-controlled luminaire 706 may include other components similar to those depicted in FIG. 2.

Figure 8:
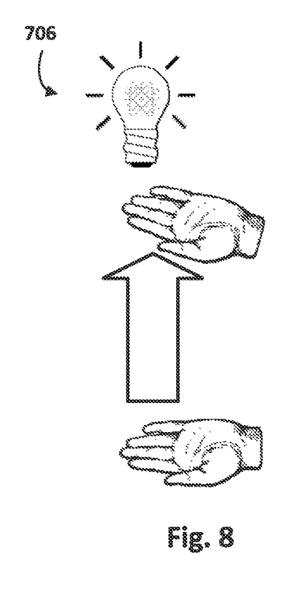

For example, a user may operate her phone to cause the phone to enter into a commissioning mode and broadcast a message to a gesture-controlled luminaire to enter into commissioning mode itself. Once in commissioning mode, the gesture-controlled luminaire may detect one or more gestures, transmit a resulting gesture event profile to the user's phone, and receive, from the phone, an association between one or more lighting control actions and the gesture event profile. A gesture event profile may be data indicative of a manner in which a user gestures at the luminaire, and may include various visual data. FIG. 8 depicts an example in which the user pushes her hand towards the lighting unit to change a lighting control action assigned during the commissioning. In some embodiments, one gesture that is not often used in the normal course of life may be defined to initiate lamp setting adjustment to prevent false positives.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of configuring a touch-controlled luminaire using an electronic mobile device, comprising:
    wirelessly receiving, at the electronic mobile device from the touch-controlled luminaire, a touch event profile indicative of a manner in which a surface of the touch-controlled luminaire was touched;
    associating, at the electronic mobile device, a lighting control action with the touch event profile; and
    wirelessly transmitting, by the electronic mobile device to at least one lighting controller, an association between the lighting control action and the touch event profile.

2. The method of claim 1, further comprising transitioning the electronic mobile device into a commissioning mode for a predetermined time interval, wherein during the predetermined time interval, the electronic mobile device is configured to perform the following operations:
    rendering output to prompt a user to touch the surface of the touch-controlled luminaire; and
    awaiting wireless receipt of the touch event profile from the touch-controlled luminaire.

3. The method of claim 2, wherein at the end of the predetermined time interval, the electronic mobile device ceases awaiting wireless receipt of the touch event profile from the touch-controlled luminaire.

4. The method of claim 2, further comprising rendering, by the electronic mobile device on a touch screen in response to receipt of the touch event profile, a user interface that is operable by a user to associate the lighting control action with the touch event profile.

5. The method of claim 4, wherein rendering the user interface comprises selectively rendering one or more user interface elements based on a capability of one or more light sources associated with the touch-controlled luminaire.

6. The method of claim 1, wherein wirelessly transmitting to at least one lighting controller comprises wirelessly transmitting directly to a controller associated with the touch-controlled luminaire.

7. The method of claim 1, wherein wirelessly transmitting to at least one lighting controller comprises wirelessly transmitting to a lighting system bridge over a local area network.

8. The method of claim 1, further comprising:
   detecting, by the electronic mobile device, a change in a capacitive path between the electronic mobile device and the touch-controlled luminaire;
   wirelessly transmitting, by the electronic mobile device to a remote computing device in response to the detected change in the capacitive path, an indication of a touch event; and
   wirelessly receiving, by the electronic mobile device from the remote computing device, an address associated with the lighting controller.

9. The method of claim 1, further comprising wirelessly transmitting, by the electronic mobile device to the lighting controller, a random number.

10. The method of claim 1, wherein at least one of the wirelessly receiving and wireless transmitting is performed using near field communication, ZigBee or coded light.

11. A non-transitory computer-readable medium comprising instructions that, in response to execution of the instructions by an electronic mobile device, cause the electronic mobile device to perform the method of claim 1.

12. A touch-controlled luminaire, comprising:
   one or more surfaces;
   a wireless communication interface;
   one or more LEDs; and
   a controller operably coupled with the wireless communication interface and the one or more LEDs, the controller configured to:
   generate a touch event profile indicative of a manner in which the one or more surfaces were touched;
   receive, via the wireless communication interface from an electronic mobile device, an association between a lighting control action and the touch event profile; and
   selectively energize the one or more LEDs in accordance with the lighting control action in response to a subsequent touch by a user that corresponds to the touch event profile.

13. The touch-controlled luminaire of claim 12, wherein the controller is further configured to transmit, to the electronic mobile device via the wireless communication interface, information configured to facilitate determining a capability of the one or more LEDs.

14. The touch-controlled luminaire of claim 13, wherein the information configured to facilitate determining the capability of the one or more LEDs comprises an identifier associated with a lighting unit with the one or more LEDs are integrated.

15. The touch-controlled luminaire of claim 12, wherein the controller is further configured to:
   detect a change in a strength of a wireless signal between the wireless communication interface and a remote computing device; and
   determine that the one or more surfaces have been touched based on a determination that the detected change satisfies a criterion.

16. The touch-controlled luminaire of claim 12, wherein the controller is further configured to:
   receive, from the electronic mobile device, a broadcast message including an address of the electronic mobile device;
   transition the touch-controlled luminaire into a commissioning mode in which the controller monitors for a touch by a user for a predetermined time interval; and
   transmit, to the electronic mobile device, the touch event profile.

17. The touch-controlled luminaire of claim 12, further comprising an accelerometer operably coupled with the controller, wherein the controller is further configured to:
   receive, from the accelerometer, a signal representative of a measured mechanical force applied to the touch-controlled luminaire;
   determine, based on the signal from the accelerometer, that the measured mechanical force corresponds to one or more touch event profiles; and
   energize the one or more LEDs to emit light having one or more properties selected based on the determination.

18. The touch-controlled luminaire of claim 12, wherein the controller is further configured to transmit, to a remote computing device associated with a wireless network, a random number.

19. The touch-controlled luminaire of claim 12, wherein the controller is further configured to:
   detect that the one or more surfaces has been touched;
   modulate a signal through a capacitive path between the electronic mobile device and the touch-controlled luminaire in response to the detection; and
   transmit, to a remote computing device in response to the detected touch change, an indication of a touch event.

20. A gesture-controlled luminaire, comprising:
   a camera;
   a wireless communication interface;
   one or more LEDs; and
   a controller operably coupled with the camera, the wireless communication interface and the one or more LEDs, the controller configured to:
   generate a gesture event profile indicative of a gesture captured by the camera;
   receive, via the wireless communication interface from an electronic mobile device, an association between a lighting control action and the gesture event profile; and
   selectively energize the one or more LEDs in accordance with the lighting control action in response to a subsequent gesture by a user that corresponds to the gesture event profile.

* * * * *